(12) United States Patent
Kim

(10) Patent No.: US 7,730,314 B2
(45) Date of Patent: Jun. 1, 2010

(54) METHOD AND APPARATUS FOR ELECTRONIC COMMERCE USING DIGITAL TICKET TO PROVIDE ANONYMITY

(75) Inventor: Hyoung-shick Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1165 days.

(21) Appl. No.: 11/252,716

(22) Filed: Oct. 19, 2005

(65) Prior Publication Data

US 2006/0085359 A1    Apr. 20, 2006

(30) Foreign Application Priority Data

Oct. 19, 2004    (KR) ...................... 10-2004-0083592

(51) Int. Cl.
*H04L 9/00*    (2006.01)
(52) U.S. Cl. .................... 713/176; 713/180; 380/30
(58) Field of Classification Search ................ 173/176; 713/176, 180; 235/379; 380/30; 705/69, 705/78

See application file for complete search history.

(56) References Cited

U.S. PATENT DOCUMENTS

| | | | | |
|---|---|---|---|---|
| 5,224,162 | A * | 6/1993 | Okamoto et al. .............. | 705/69 |
| 5,604,805 | A | 2/1997 | Brands | |
| 6,341,273 | B1 | 1/2002 | Briscoe | |
| 6,438,691 | B1 * | 8/2002 | Mao ............................ | 713/176 |
| 7,093,130 | B1 * | 8/2006 | Kobayashi et al. ........... | 713/176 |
| 2002/0094090 | A1 | 7/2002 | Iino | |
| 2003/0105954 | A1 | 6/2003 | Immonen et al. | |

FOREIGN PATENT DOCUMENTS

| | | |
|---|---|---|
| EP | 0 518 365 A5 | 12/1992 |
| EP | 0 938 068 A2 | 8/1999 |
| JP | 3-73065 A | 3/1991 |
| JP | 5-20344 A | 1/1993 |
| JP | 8-249286 A | 9/1996 |
| JP | 2000-222360 A | 8/2000 |
| JP | 2000-306003 A | 11/2000 |
| JP | 2000-331073 A | 11/2000 |
| JP | 2002-183633 A | 6/2002 |
| JP | 2002-352163 A | 12/2002 |

(Continued)

OTHER PUBLICATIONS

Chaum, D.; Fiat, A.; Naor, M. "Untraceable Electronic Cash". 1989. Proceedings of Crypto'88, pp. 319-327. Available at http://www.wisdom.weizmann.ac.il/~naor/PAPERS/untrace.ps. Downloaded Feb. 27, 2009.*

(Continued)

*Primary Examiner*—Nasser Moazzami
*Assistant Examiner*—Travis Pogmore
(74) *Attorney, Agent, or Firm*—Sughrue Mion, PLLC

(57) ABSTRACT

A method and apparatus for electronic commerce using a digital ticket are provided. The method for electronic commerce using a digital ticket includes hiding a message comprising a random number and transmitting the hidden message to a ticket issuer, receiving the hidden message signed with a digital signature by the ticket issuer, verifying the digital signature on the message, and transmitting the message with the verified digital signature to the ticket issuer to consume a digital ticket.

16 Claims, 11 Drawing Sheets

FOREIGN PATENT DOCUMENTS

| | | |
|---|---|---|
| JP | 2003-338813 A | 11/2003 |
| JP | 2004-139323 A | 5/2004 |
| KR | 2003-0027358 A | 4/2003 |
| KR | 10-2004-0087362 A | 10/2004 |
| WO | 97/09688 A2 | 3/1997 |
| WO | 2004/084050 A1 | 9/2004 |

OTHER PUBLICATIONS

Rivest, R.; Shamir, A. "PayWord and MicroMint: Two simple micropayment schemes". Apr. 27, 2001. Available at http://people.csail.mit.edu/rivest/RivestShamir-mpay.pdf. Downloaded Feb. 27, 2009.*

Hidetaka Aizawa et al., "Electronic Money and the Patent Law"; First Edition, Japan, Issued by Kobundo Publishers Inc; Apr. 30, 1999, pp. 136-140.

Koide, Atsushi et al., "Linkable Anonymous Off-line E-cash" Mar. 22, 2000, p. 143-148, Japan.

Okada, Sadamu, "Electronic Money as a Means of Payment on the Internet Commerce" Technical Report of IEICE, Nov. 22, 1996, p. 7-12, Japan.

Mikami, Kyoko et al., "Transferable Off-line Anonymous Electronic Tickets System", IPSJ SIG Technical Report, Jul. 21, 2004. p. 367-374, Japan.

* cited by examiner ved by applying the hash function to the message as many times as a value one less than the number of times that the hash function has been applied to obtain the hash value, to consume a digital ticket.

METHOD AND APPARATUS FOR ELECTRONIC COMMERCE USING DIGITAL TICKET TO PROVIDE ANONYMITY

CROSS-REFERENCE TO RELATED APPLICATION

This application claims priority from Korean Patent Application No. 10-2004-0083592 filed on Oct. 19, 2004 in the Korean Intellectual Property Office, the disclosure of which is incorporated herein by reference in its entirety.

BACKGROUND OF THE INVENTION

1. Field of the Invention

The present invention relates to a method and apparatus for electronic commerce using a digital ticket, and more particularly, to a method and apparatus for electronic commerce using a digital ticket, by which anonymity is guaranteed so that information exposure of a digital ticket user is minimized and the use of a service is facilitated.

2. Description of the Related Art

The Internet enables efficient collection and processing of useful information, and acquisition of diverse goods and services online (i.e., without physical contact). Thus, various electronic payment schemes such as an encrypted credit card, electronic cash, and a micropayment system have been designed and implemented for electronic commerce. For example, a service provider on a network usually issues a certificate to ensure a user's special right to use a service. This certificate is referred to as a digital ticket. The concept of electronic commerce using the digital ticket has been disclosed. For example, U.S. Pat. No. 6,236,971 discloses a related art system for controlling the distribution and use of digital works using digital tickets.

However, the related art digital ticket allows ticket issuers or service providers to easily monitor and record a user's behavior during the issuing and consuming (e.g., redemption or usage) of the ticket, which may cause a problem in that the sensitive information of the user is revealed.

SUMMARY OF THE INVENTION

The present invention provides a method and apparatus for electronic commerce using a digital ticket, by which anonymity is guaranteed so that information exposure of a digital ticket user is minimized and the use of a service is facilitated.

According to an exemplary, n-limiting aspect, there is provided a method for electronic commerce using a digital ticket. The method includes generating a random number, generating a message including the random number, applying a hash function to the message, hiding a hash value obtained by applying the hash function to the message, transmitting the hidden hash value to a ticket issuer, receiving a message in which the ticket issuer has signed the hash value with a digital signature, verifying the digital signature on the received message, and transmitting to the ticket issuer the message with the verified digital signature and a value obtained by applying the hash function to the message a number of times one less than a number of times that the hash function has been applied to obtain the hash value.

According to another exemplary, non-limiting aspect, there is provided a method for electronic commerce using a digital ticket, the method including hiding a hash value obtained by applying a hash function to a message comprising a random number and transmitting the hidden value to a ticket issuer, receiving a message that comprises the transmitted hash value and are signed with a digital signature by the ticket issuer, verifying the digital signature on the received message, and transmitting to the ticket issuer the message with the verified digital signature and a value obtained by applying the hash function to the message as many times as a value one less than the number of times that the hash function has been applied to obtain the hash value, to consume a digital ticket.

According to still another exemplary, non-limiting aspect, there is provided a method for electronic commerce using a digital ticket, the method including receiving hidden messages each comprising a random number generated by a ticket user, signing one received message with a digital signature, and transmitting the message with the digital signature to the ticket user.

According to a further exemplary, non-limiting aspect, there is provided a method for electronic commerce using a digital ticket, the method including receiving a message that comprises a random number generated by a ticket user and is signed with a digital signature by a ticket issuer, verifying the message, inspecting whether the message is used duplicately, and providing a service to the ticket user when the message is not used duplicately.

According to yet another exemplary, non-limiting aspect, there is provided a method for electronic commerce using a digital ticket, the method including receiving a hash value that is generated by a ticket user and is signed with a digital signature by a ticket issuer and an input hash value used to generate the hash value, verifying the hash value and the input hash value, inspecting whether the hash value is used duplicately, and providing a service to the ticket user when the hash value is not used duplicately.

According to another exemplary, non-limiting aspect, there is provided an apparatus for electronic commerce using a digital ticket, the apparatus including a message generation module generating a random number and generating a message including the random number, a message processing module hiding the message, and a transceiver module transmitting the hidden message to a ticket issuer and receiving the hidden message signed with a digital signature by the ticket issuer, wherein the message processing module verifies the digital signature on the received message, and the transceiver module transmits the verified message with the digital signature to the ticket issuer to consume a digital ticket.

According to another exemplary, non-limiting aspect, there is provided an apparatus for electronic commerce using a digital ticket, the apparatus including a message generation module generating a random number and generating a message including the random number, a hashing module applying a hash function to the message, a message processing module hiding a hash value obtained by applying the hash function to the message, and a transceiver module transmitting the hidden hash value to a ticket issuer and receiving a message in which the hash value is signed with a digital signature by the ticket issuer, wherein the message processing module verifies the digital signature on the received message, and the transceiver module transmits the verified message with the digital signature and a value, which is obtained by applying the hash function a number of times one less than a number of times that the hash function has been applied to obtain the hash value, to the ticket issuer to consume a digital ticket.

According to another exemplary, non-limiting aspect, there is provided an apparatus for electronic commerce using a digital ticket, the apparatus including a transceiver module receiving a hidden message including a random number generated by a ticket user, and a blind signature module signing the received message with a digital signature, wherein the transceiver module transmits the message with the digital signature to the ticket user.

According to another exemplary, non-limiting aspect, there is provided an apparatus for electronic commerce using a digital ticket, the apparatus including a transceiver module receiving a message that includes a random number generated by a ticket user and is signed with a digital signature by a ticket issuer, a digital signature verification module verifying the received message, and a duplicate use inspection module inspecting whether the message is used duplicately.

According to another exemplary, non-limiting aspect, there is provided an apparatus for electronic commerce using a digital ticket, the apparatus including a transceiver module receiving a hash value that is generated by a ticket user and is signed with a digital signature by a ticket issuer and an input hash value used to generate the hash value, a digital signature verification module verifying the digital signature on the hash value, a hashing module verifying a relationship between the hash value with the digital signature and the input hash value, and a duplicate use inspection module inspecting whether the hash value is used duplicately.

BRIEF DESCRIPTION OF THE DRAWINGS

The above and other aspects of the present invention will become more apparent by describing in detail exemplary, non-limiting embodiments thereof with reference to the attached drawings in which.

DETAILED DESCRIPTION OF EXEMPLARY EMBODIMENTS OF THE INVENTION

Figure 1:
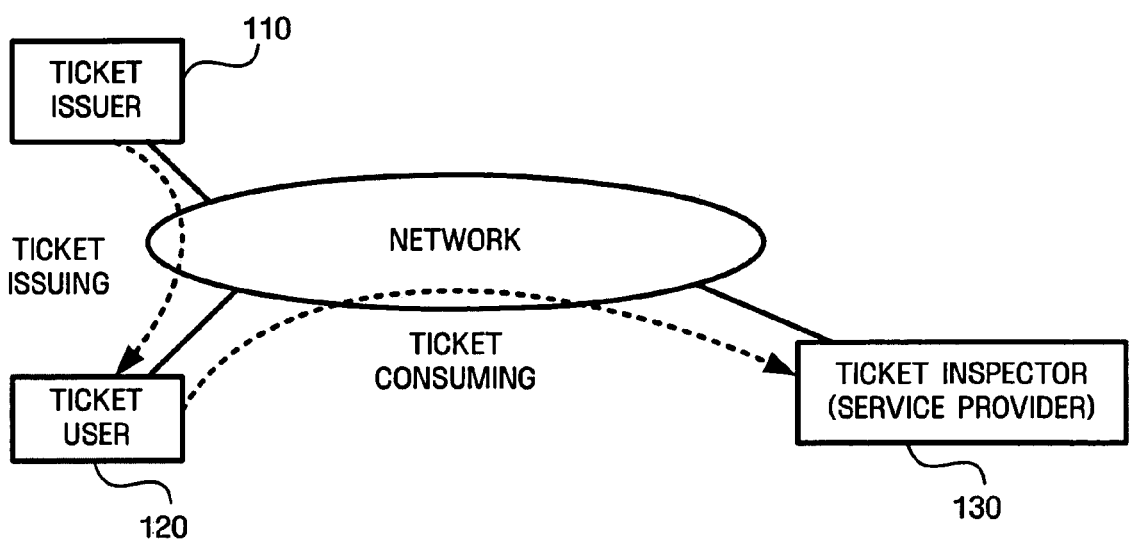
FIG. 1 illustrates the concept of electronic commerce using a digital ticket.

Advantages and features of the present invention and methods of accomplishing the same may be understood more readily by reference to the following detailed description of exemplary, non-limiting embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary, non-limiting embodiments are shown.

FIG. 1 illustrates the concept of electronic commerce using a digital ticket. The digital ticket is a digital certificate that ensures a ticket holder a right to request a service designated on the ticket. Usually, the digital ticket indicates a message that contains information regarding a ticket user and information regarding a service right defined under joint agreement, and that is signed with a digital signature of a ticket issuer. Participants in electronic commerce using a digital ticket are largely classified into three types: a ticket issuer 110, a ticket user 120, and a ticket inspector (or a service provider) 130.

The ticket issuer 110 generates a digital ticket, signs the digital ticket with a digital signature, and issues the digital ticket. The ticket user 120 uses the digital ticket to be provided with a service. The ticket inspector 130 verifies the validity of the digital ticket and provides the service designated on the digital ticket. The ticket issuer 110 and the ticket inspector 130 may or may not be the same, depending upon the specific practical application. A typical mechanism of the electronic commerce using the digital ticket includes an operation in which the ticket user 120 makes an agreement on ticket purchasing with the ticket issuer 110 and acquires the digital ticket issued by the ticket issuer 110 according to the agreement, and an operation in which the ticket user 120 consumes (i.e., redeems or uses) the digital ticket and receives a service provided by the ticket inspector 130.

Figure 2:
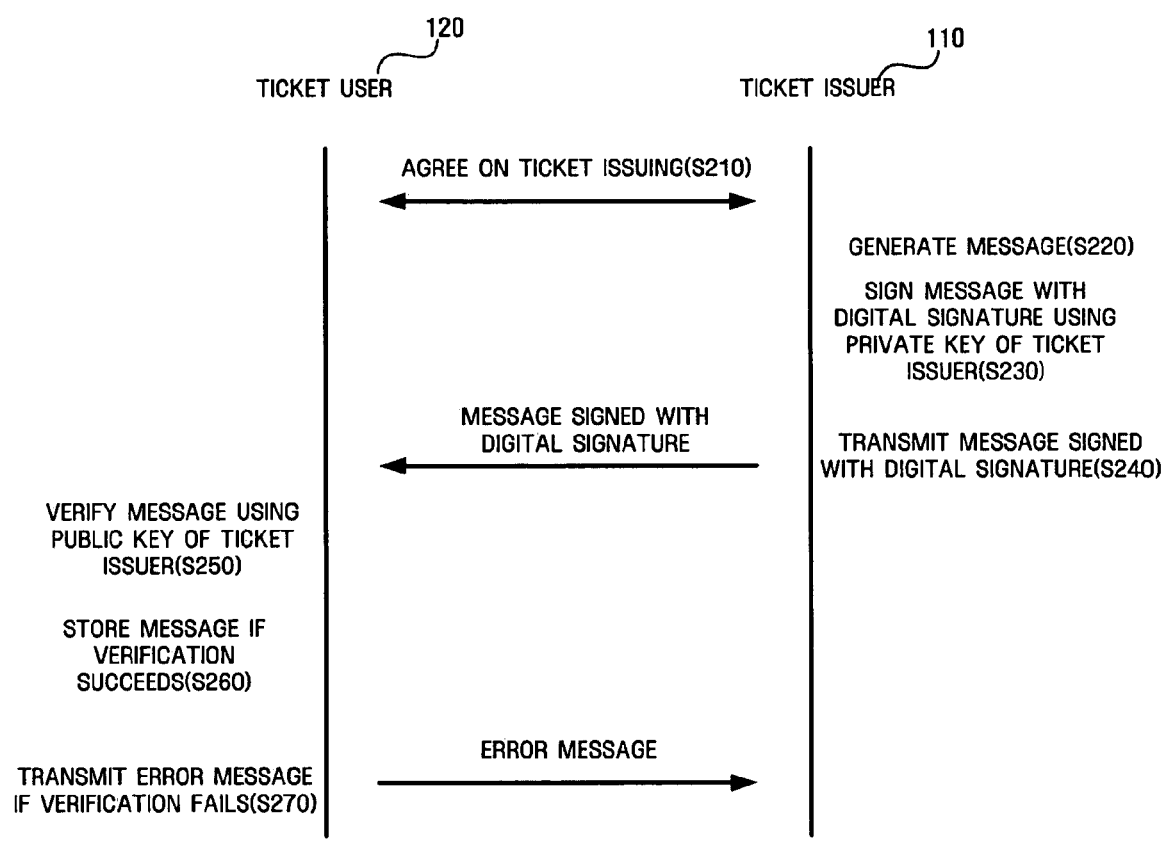
FIG. 2 is a flowchart of a related art procedure of issuing a digital ticket.

FIG. 2 is a flowchart of a related art procedure of issuing a digital ticket. In operation S210, a ticket user 120 and a ticket issuer 110 make an agreement on ticket issuing. The ticket issuer 110 generates a message containing information regarding the ticket issuer 110, a counter value for preventing duplicate use of the digital ticket, and the number of times (hereinafter referred to as a ticket usable count) that the digital ticket can be used in operation S220. Next, the ticket issuer 110 signs the message with a digital signature using its private key in operation S230 and transmits the signed message to the ticket user 110 in operation S240.

Next, in operation S250, the ticket user 120 decodes the message signed with the digital signature (i.e., the digital ticket received from the ticket issuer 110) using a public key of the ticket issuer 110 and verifies whether the digital signature has been written by the ticket issuer 110, or whether service content coincides with content agreed upon in advance. If the verification succeeds, the ticket user 120 stores the digital ticket in operation S260. However, if the digital signature has not been written by the ticket issuer 110 or the service content does not coincide with the content agreed in advance, the ticket user 120 transmits an error message to the ticket issuer 110 in operation S270.

Figure 3:
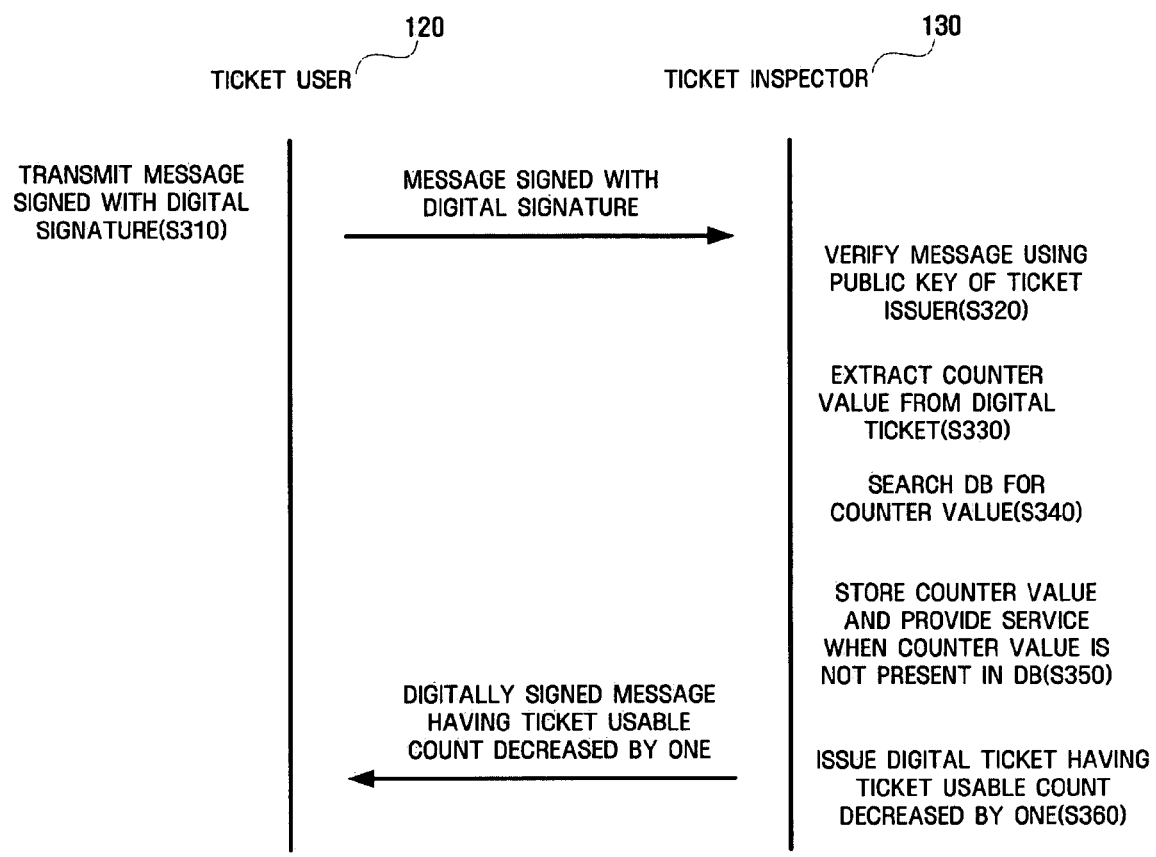
FIG. 3 is a flowchart of a related art procedure of consuming a digital ticket.

FIG. 3 is a flowchart of a related art procedure of consuming a digital ticket. In operation S310, a ticket user 120 transmits a digital ticket stored therein to a ticket inspector (or a service provider) 130 to receive a service. In operation S320, the ticket inspector 130 decodes the digital ticket using a private key of a ticket issuer to verify whether the digital ticket is valid. If the digital ticket is verified as valid, in order to inspect whether the digital ticket is used duplicately, the ticket inspector 130 extracts a counter value for the prevention of a duplicate use from the digital ticket in operation S330 and searches a database (DB) for the counter value in operation S340.

If the counter value is not present in the DB, then the current usage is the first use of the digital ticket. Accordingly, the ticket inspector 130 stores the counter value in the DB and provides the service to the ticket user 120 in operation S350. If the digital ticket can be used more than once, the ticket inspector 130 issues a new ticket having a ticket usable count decreased by one in operation S360. The new ticket having the ticket usable count decreased by one is issued through the procedure shown in FIG. 2. Meanwhile, if the counter value is already present in the DB, the ticket inspector 130 may transmit a reject message to the ticket user 120 since the digital ticket has been already used.

According to the related art ticket issuing and consuming procedures shown in FIGS. 2 and 3, respectively, the ticket issuer 110 and the ticket inspector 130 can acquire information of the ticket user 120. As a result, the anonymity of the ticket user 120 is not guaranteed and the behavior of the ticket user 120 using a service may be monitored. Accordingly, the concept of a digital ticket that guarantees the anonymity of the ticket user 120 is desired.

Figure 4:
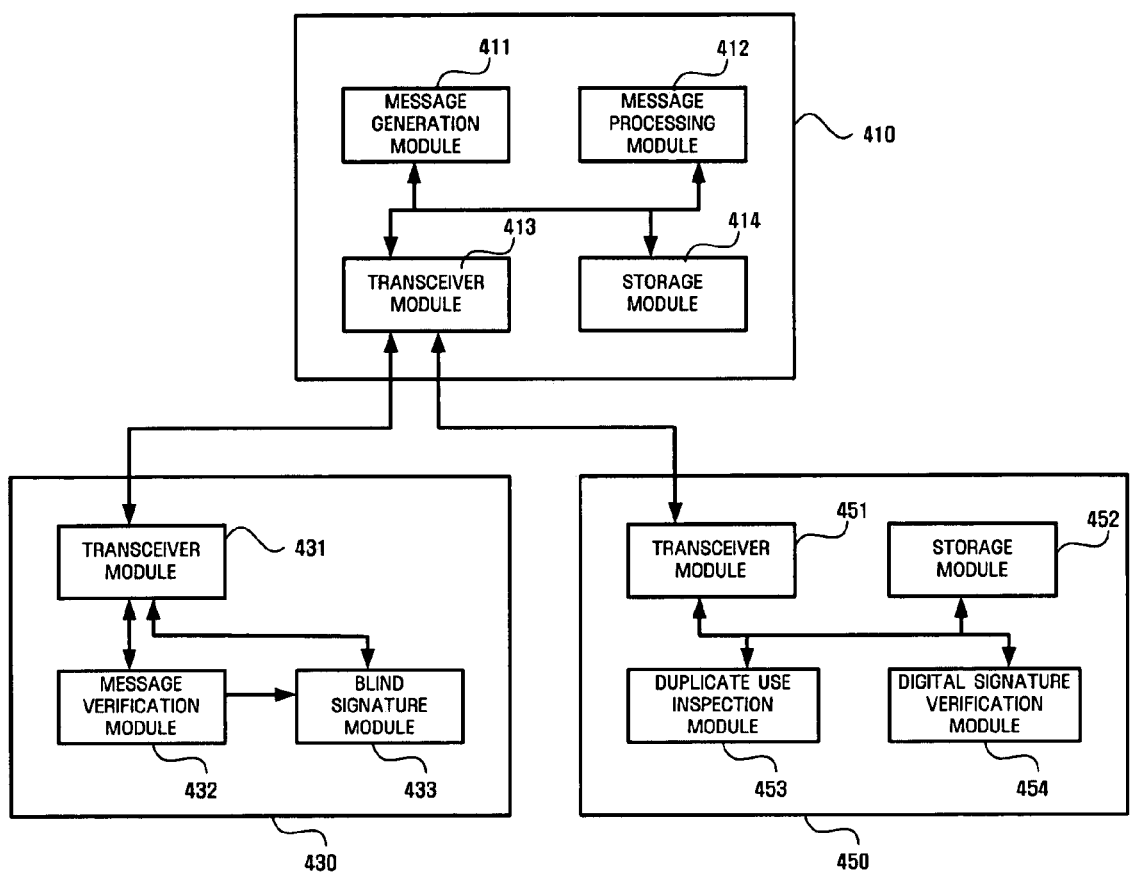
FIG. 4 is a block diagram of an electronic commerce system using a digital ticket according to an exemplary, non-limiting embodiment.

FIG. 4 is a block diagram of an electronic commerce system using a digital ticket according to an exemplary, non-limiting embodiment. The electronic commerce system includes a ticket user 410, a ticket issuer 430, and a ticket inspector 450.

A message including the content of a digital ticket is generated by the ticket user 410 to guarantee the anonymity of the ticket user 410. In other words, the ticket user 410 generates a message containing a unique random number of a digital ticket for the prevention of a duplicate use and information regarding the ticket issuer 430. The message may include a ticket usable count when the digital ticket can be used more than once, and may not include the ticket usable count when the digital ticket is for one-time use only. As described above, the ticket issuer 430 and the ticket inspector 450 may be different, or they may be the same device physically, depending on the implementation. The ticket user 410 includes a message generation module 411, a message processing module 412, a transceiver module 413, and a storage module 414. The elements and modules may be implemented to reproduce one or more central processing units (CPUs) in an apparatus for electronic commerce.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed by one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed by one or more CPUs in a communication system.

The message generation module 411 generates a unique random number to be contained in a digital ticket, generates a message containing the random number, information regarding the ticket issuer 430, and a ticket usable count when the digital ticket can be used more than once, and provides the message to the message processing module 412. The message processing module 412 hides the message generated by the message generation module 411, verifies a digital signature on a message blindly signed by the ticket issuer 430, and unblinds a hidden message to extract a message with an unblinded digital signature, i.e., a digital ticket. The storage module 414 stores the digital ticket extracted by the message processing module 412. The transceiver module 413 transmits and receives messages.

The ticket issuer 430 includes a transceiver module 431, a message verification module 432, and a blind signature module 433.

The transceiver module 431 receives a message transmitted from the transceiver module 413 of the ticket user 410 and transmits a message blindly signed by the blind signature module 433 to the ticket user 410. When the message received from the ticket user 410 is a blind or encrypted message, the message verification module 432 unblinds or decodes the message and verifies whether the content of the message coincides with the content of advance agreement. The blind signature module 433 signs the message verified by the message verification module 432 with a blind signature.

The ticket inspector 450 includes a transceiver module 451, a storage module 452, a duplicate use inspection module 453, and a digital signature verification module 454.

The transceiver module 451 receives the digital ticket from the ticket user 410 and when a ticket usable count of the received digital ticket has a value of at least two, transmits to the ticket user 410 a message requesting to issue a digital ticket having the ticket usable count decreased by one. The digital signature verification module 454 verifies whether a digital signature on the digital ticket received from the transceiver module 451 has been written by the ticket issuer 430 by decoding the digital ticket using a public key of the ticket issuer 430. The duplicate use inspection module 453 inspects whether the digital ticket received from the ticket user 410 has been already consumed.

The duplicate use inspection module 453 extracts a random number for the prevention of a duplicate use from the digital ticket and searches the storage module 452 for the random number. If the random number is not present in the storage module 452, the duplicate use inspection module 453 stores the random number in the storage module 452 since this time is the first use of the digital ticket. Here, hiding may be performed using a related art data encryption algorithm. The blind signature may be implemented using a generally known blind signature scheme such as an RSA-based blind signature scheme or a DLP-based blind signature scheme. The detailed operations of the electronic commerce system according to the exemplary, non-limiting embodiment illustrated in FIG. 4 will be described with reference to FIGS. 6 through 9 later.

Figure 5:
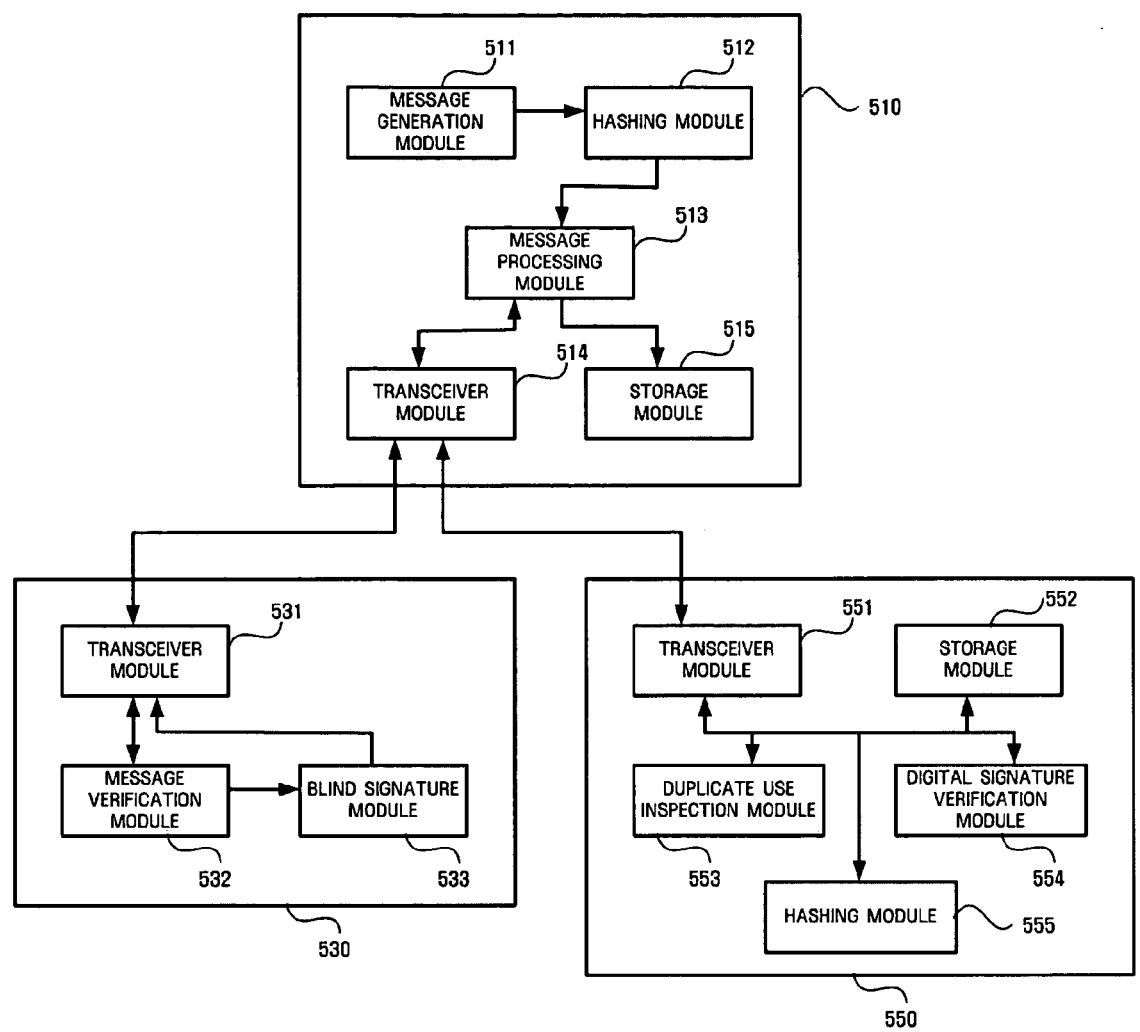
FIG. 5 is a block diagram of an electronic commerce system using a digital ticket according to another exemplary, non-limiting embodiment.

FIG. 5 is a block diagram of an electronic commerce system using a digital ticket according to another exemplary, non-limiting embodiment. The electronic commerce system includes a ticket user 510, a ticket issuer 530, and a ticket inspector 550.

The ticket user 510 includes a message generation module 511, a hashing module 512, a message processing module 513, a transceiver module 514, and a storage module 515.

The message generation module 511 generates a unique random number to be contained in a digital ticket, generates a message containing the random number and information regarding the ticket issuer 530, and provides the message to the hashing module 512. The hashing module 512 generates a hash value by consecutively applying a one-way hash function to the message (ticket usable count+2) times. The message processing module 513 hides the hash value generated by the hashing module 512, verifies a digital signature on a message blindly signed by the ticket issuer 530, and unblinds a hidden message to extract a message with an unblinded digital signature. The storage module 515 stores the message with the unblinded digital signature, which is extracted by the message processing module 513. The transceiver module 514 transmits and receives messages.

The ticket issuer 530 includes a transceiver module 531, a message verification module 532, and a blind signature module 533.

The transceiver module 531 receives a message transmitted from the transceiver module 514 of the ticket user 510 and transmits a message blindly signed by the blind signature module 533 to the ticket user 510. The message verification module 532 unblinds or decodes the message transmitted from the ticket user 510 and verifies whether the content of the message coincides with the content of advance agreement. The blind signature module 533 signs the message verified by the message verification module 532 with a blind signature.

The ticket inspector 550 includes a transceiver module 551, a storage module 552, a duplicate use inspection module 553, a digital signature verification module 554, and a hashing module 550.

The transceiver module 551 receives a digital ticket from the ticket user 510 and when a ticket usable count of the received digital ticket is at least 2, transmits to the ticket user 510 a message corresponding to a digital ticket having the ticket usable count decreased by one. The digital signature verification module 554 verifies whether a digital signature on the digital ticket received from the transceiver module 551 has been written by the ticket issuer 530 by decoding the digital ticket using a public key of the ticket issuer 530. The hashing module 550 determines whether two hash values received from the ticket user 510 have a correct relationship therebetween.

This operation of the hashing module 550 will be described in detail with reference to FIG. 11 later. The duplicate use inspection module 553 inspects whether the digital ticket received from the ticket user 510 has been already consumed. The duplicate use inspection module 553 searches the storage module 552 for a hash value transmitted from the ticket user 510. If the hash value is not present in the storage module 552, the duplicate use inspection module 553 stores the hash value in the storage module 552 since this time is the first use of the digital ticket.

The detailed operations of the electronic commerce system according to the exemplary, non-limiting embodiment illustrated in FIG. 5 will be described with reference to FIGS. 10 and 11 later.

Figure 6:
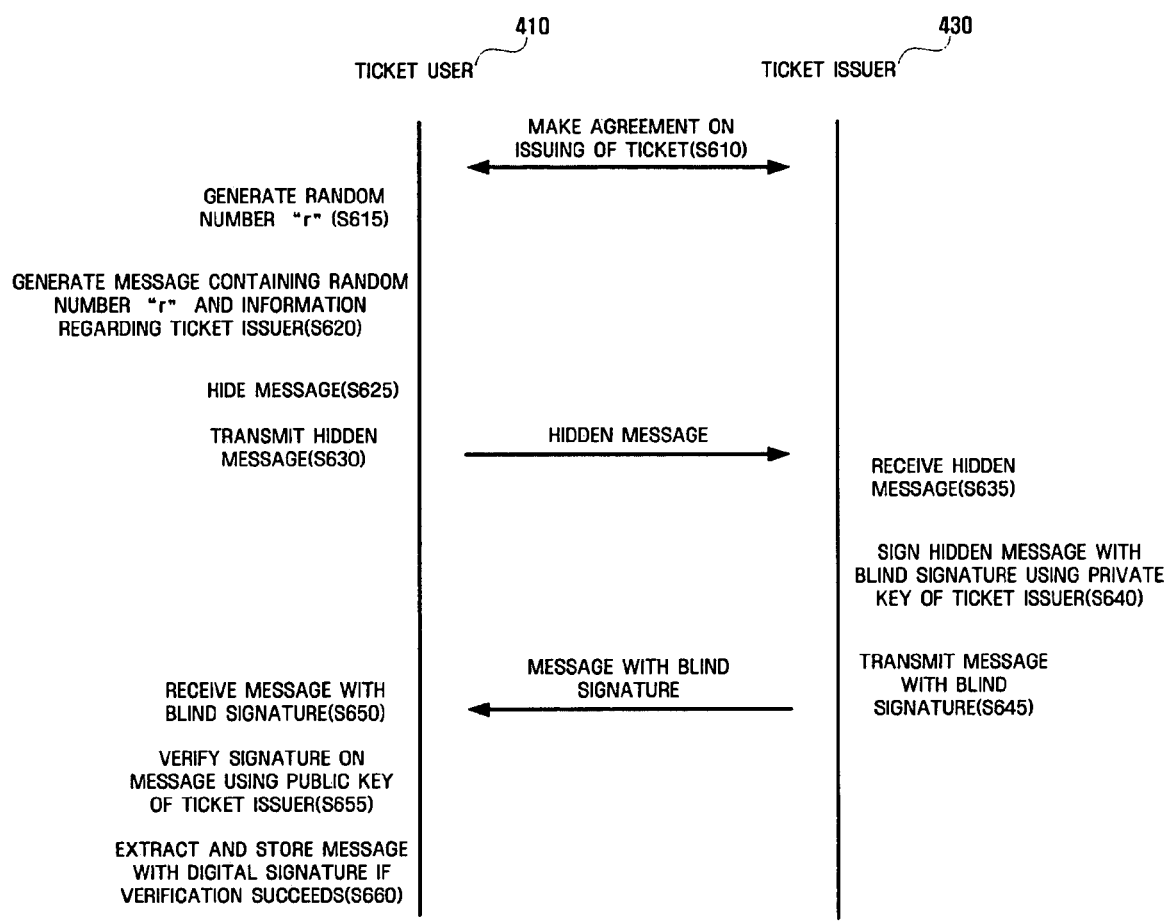
FIG. 6 is a flowchart of a procedure of issuing a digital ticket for one-time use only in the electronic commerce system shown in FIG. 4.

FIG. 6 is a flowchart of a procedure of issuing a digital ticket for one-time use only in the electronic commerce system shown in FIG. 4. The digital ticket for one-time use only can be designed using a blind signature.

In operation S610, the ticket user 410 and the ticket issuer 430 make an agreement on the issuing of the digital ticket for one-time use only. The ticket user 410 generates a unique random number "r", which is for duplicate use inspection, through the message generation module 411 in operation S615 and generates a message containing the random number "r" and information regarding the ticket issuer 430 in operation S620. The ticket user 410 hides the message using the message processing module 412 in operation S625 and transmits the hidden message to the ticket issuer 430 through the transceiver module 413 in operation S630.

The ticket issuer 430 receives the hidden message through the transceiver module 431 in operation S635, signs the message with a blind signature using a private key thereof through the blind signature module 433 in operation S640, and transmits the message with the blind signature (i.e., a digital ticket) to the ticket user 410 through the transceiver module 431 in operation S645.

The ticket user 410 receives the digital ticket from the ticket issuer 430 in operation S650 and verifies whether a digital signature on the digital ticket has been written by the ticket issuer 430, by decoding the digital ticket using a public key of the ticket issuer 430 through the message processing module 412 in operation S655. If the verification succeeds, the ticket user 410 unblinds the message to extract the message with the digital signature and stores the message with the digital signature in the storage module 414 in operation S660.

Figure 7:
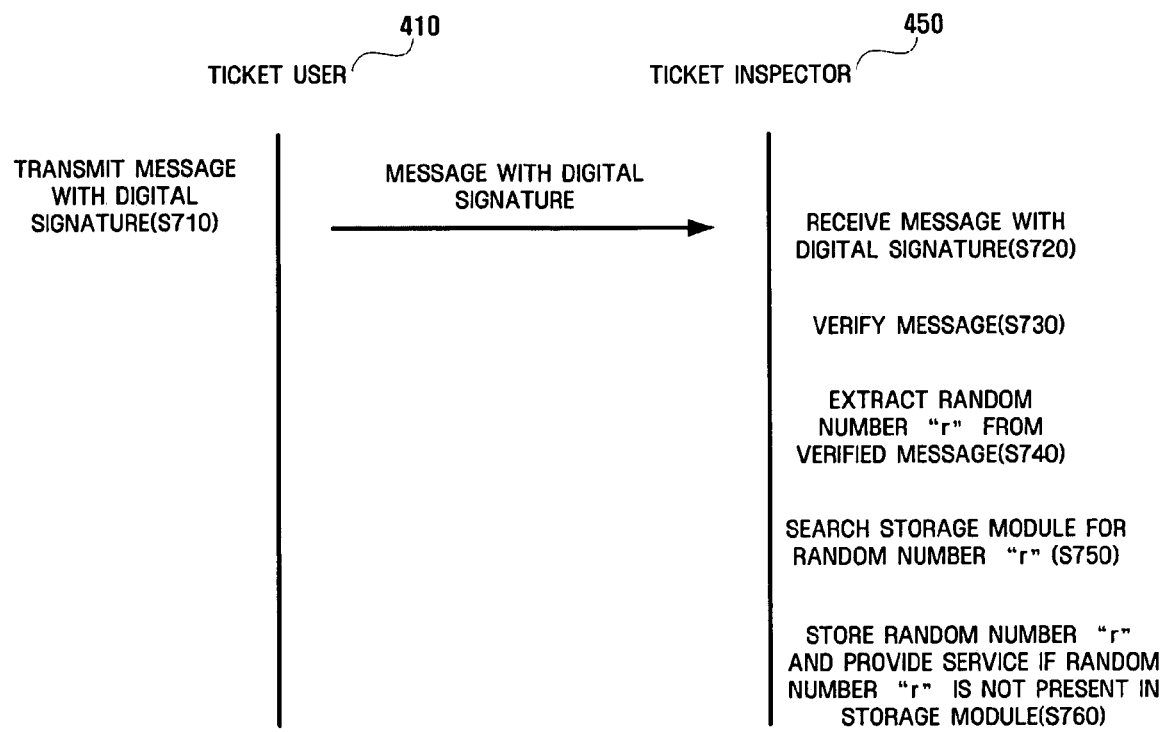
FIG. 7 is a flowchart of a procedure of consuming a digital ticket for one-time use only in the electronic commerce system shown in FIG. 4.

FIG. 7 is a flowchart of a procedure of consuming a digital ticket for one-time use only in the electronic commerce system shown in FIG. 4. The digital ticket issued through the procedure shown in FIG. 6 is consumed as follows.

The ticket user 410 transmits a message with a digital signature stored therein to the ticket inspector 450 in operation S710. The ticket inspector 450 receives the message in operation S720, and verifies whether the digital signature on the message has been written by the ticket issuer 430 by decoding the message using the private key of the ticket issuer 430 through the digital signature verification module 454 in operation S730. If the digital signature has been written by the ticket issuer 430, the ticket inspector 450 performs duplicate use inspection through the duplicate use inspection module 453 in operations S740 and S750. If it is determined that the message is a new digital ticket, the ticket inspector 450 provides a service corresponding to a right of the digital ticket to the ticket user 410 and consumes the digital ticket in operation S760.

The duplicate use inspection is performed by inspecting whether a random number "r" contained in the message transmitted from the ticket user 410 is the same as one of random numbers of previously consumed digital tickets.

More specifically, the ticket inspector 450 extracts the random number "r" from the message in operation S740 and searches the storage module 452 for the random number "r" in operation S750. If the random number "r" is not present in the storage module 452, the ticket inspector 450 stores the random number "r" in the storage module 452 and provides the service corresponding to the right of the digital ticket to the ticket user 410 in operation S760.

Meanwhile, if the random number "r" is present in the storage module 452, the ticket inspector 450 may reject the consumption of the digital ticket since the digital ticket is used duplicately.

Figure 8:
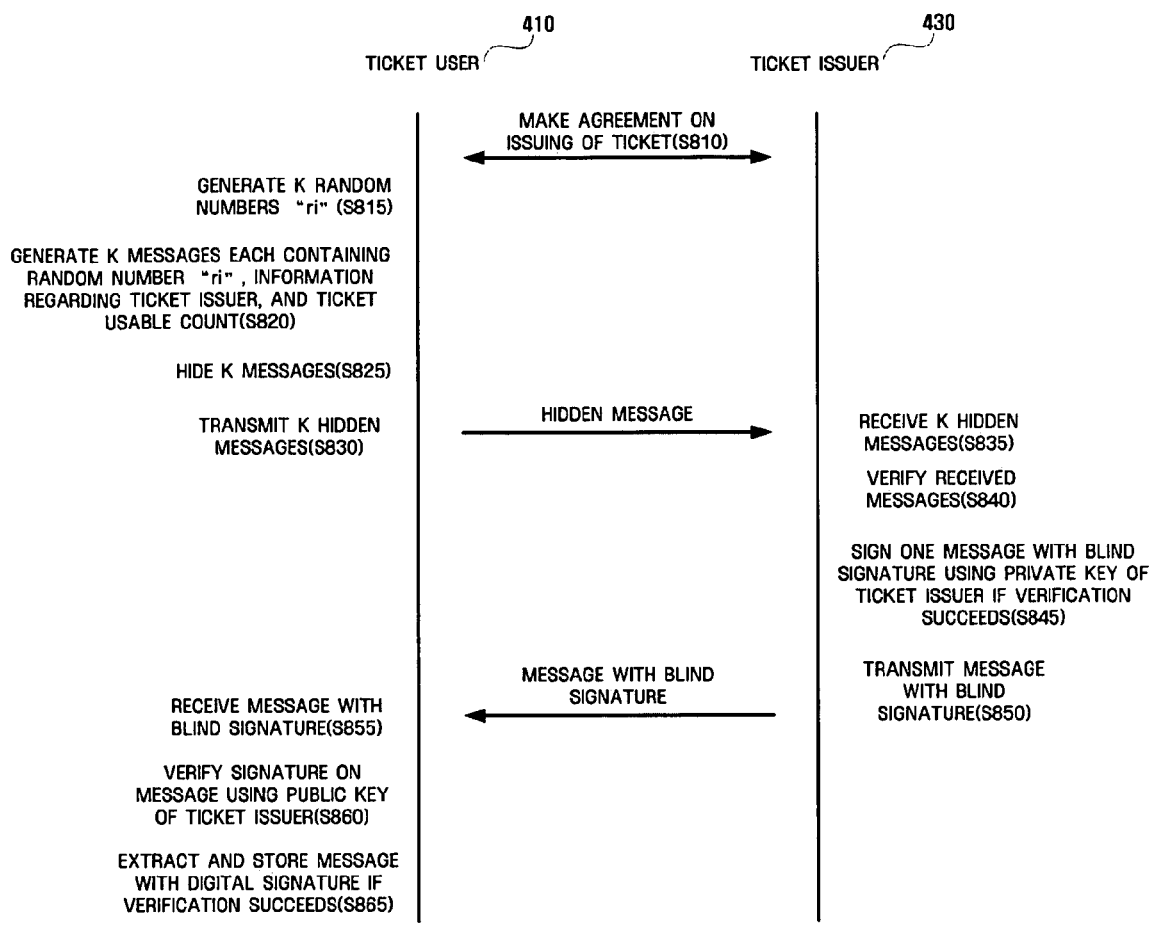
FIG. 8 is a flowchart of a procedure of issuing a digital ticket, which can be used more than once, in the electronic commerce system shown in FIG. 4.

FIG. 8 is a flowchart of a procedure of issuing a digital ticket, which can be used more than once, in the electronic commerce system shown in FIG. 4. In operation S810, the ticket user 410 and the ticket issuer 430 make agreement on issuing of the digital ticket that can be used more than once The ticket user 410 generates K unique random numbers "$r_i$", which are used for duplicate use inspection, through the message generation module 411 in operation S815, and generates K messages each containing the random number "$r_i$", information regarding the ticket issuer 430, and a ticket usable count in operation S820. The ticket user 410 hides the K messages using the message processing module 412 in operation S825 and transmits the K hidden messages to the ticket issuer 430 through the transceiver module 413 in operation S830.

The ticket issuer 430 receives the K messages through the transceiver module 431 in operation S835 and verifies information contained in the K messages through the message verification module 432 in operation S840. If the K messages are verified, the ticket issuer 430 signs one of the K messages with a blind signature using a private key thereof through the blind signature module 433 in operation S845, and transmits the message with the blind signature (i.e., a digital ticket) to the ticket user 410 through the transceiver module 431 in operation S850.

The ticket user 410 receives the digital ticket from the ticket issuer 430 in operation S855 and verifies whether a digital signature on the digital ticket has been written by the ticket issuer 430 by decoding the digital ticket using a public key of the ticket issuer 430 through the message processing module 412 in operation S860. If the verification succeeds, the ticket user 410 unblinds the message to extract the message with the digital signature and stores the message with the digital signature in the storage module 414 in operation S865.

Operation S845 is performed as follows. The message verification module 432 randomly selects one message from among the K messages and requests unblind key values used to unblind the remaining (K-1) messages from the ticket user 410. The message verification module 432 unblinds the (K-1) messages using the unblind key values and verifies whether information (e.g., a ticket usable count) contained in each of the (K-1) messages coincides with the content of the agreement made in operation S810.

If the information contained in the (K-1) messages coincides with the content of the agreement, it can be presumed that the randomly selected one message also contains correct information, and thus the message verification module 432 transmits the selected one message to the blind signature module 433. When K is appropriately selected, a probability of selecting the one message from among the K messages is $1/2^K$. As a result, it is difficult for the ticket user 410 to predict a message to be selected by the ticket issuer 430, and therefore, it is almost impossible to cheat on the ticket usable count or the like. K indicates the number of random numbers and may be adaptively determined according to environmental factors such as a security state of a network and a required security level.

As described above, only messages other than a message randomly selected by the ticket issuer 430 are opened to the public, and the selected message is signed with a digital signature in a blind state by the blind signature module 433 of the ticket issuer 430, and is then transmitted to the ticket user 410. Accordingly, ticket user information is not exposed during the issuing of a digital ticket.

Figure 9:
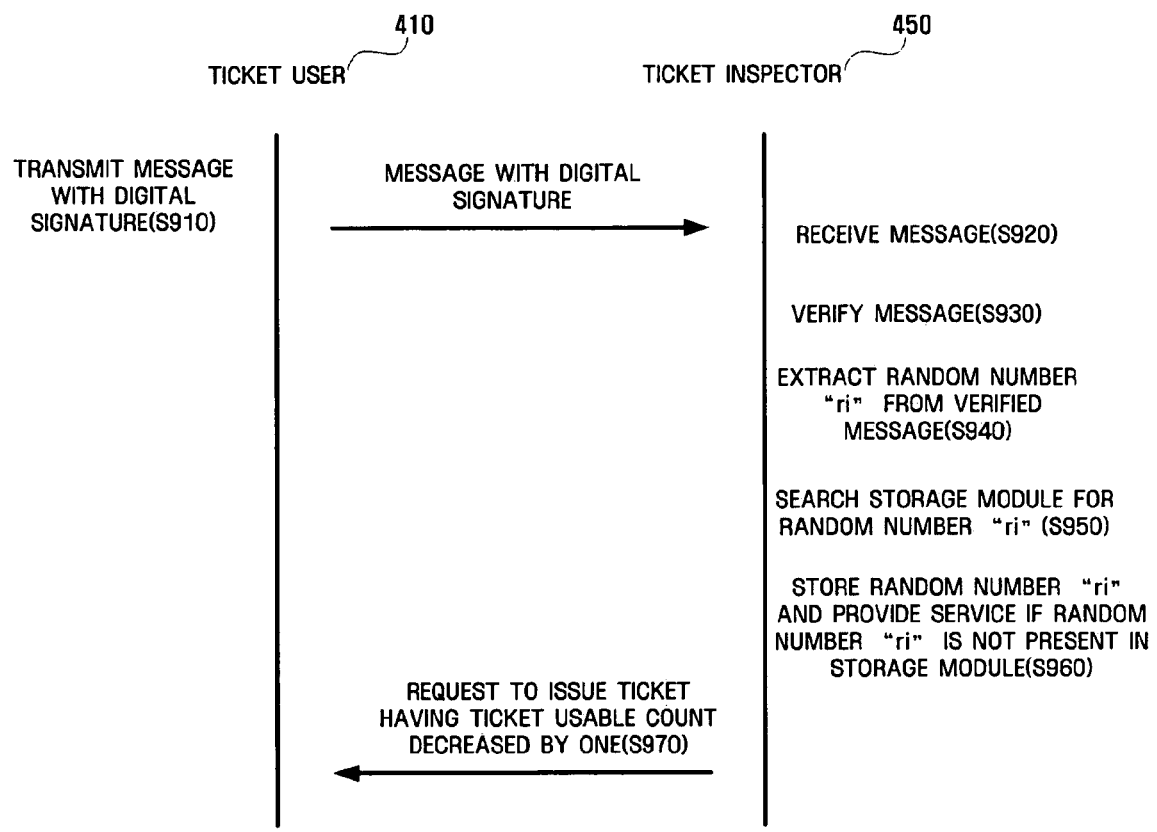
FIG. 9 is a flowchart of a procedure of consuming a digital ticket, which can be used more than once, in the electronic commerce system shown in FIG. 4.

FIG. 9 is a flowchart of a procedure of consuming a digital ticket, which can be used more than once, in the electronic commerce system shown in FIG. 4. The digital ticket issued through the procedure shown in FIG. 8 is consumed as follows.

The ticket user 410 transmits a message with a digital signature stored therein to the ticket inspector 450 in operation S910. The ticket inspector 450 receives the message in operation S920 and verifies whether the digital signature on the message has been written by the ticket issuer 430 by decoding the message using the private key of the ticket issuer 430 through the digital signature verification module 454 in operation S930.

If the digital signature has been written by the ticket issuer 430, the ticket inspector 450 performs duplicate use inspection through the duplicate use inspection module 453 in operations S940 and S950. If it is determined that the message is a new digital ticket, the ticket inspector 450 provides a service corresponding to a right of the digital ticket to the ticket user 410 and consumes the digital ticket in operation S960.

The duplicate use inspection is performed by inspecting whether a random number "$r_i$" contained in the message transmitted from the ticket user 410 is the same as one of random numbers of previously consumed digital tickets. More specifically, the ticket inspector 450 extracts the random number "$r_i$" from the message in operation S940 and searches the storage module 452 for the random number "$r_i$" in operation S950. If the random number "$r_i$" is not present in the storage module 452, the ticket inspector 450 stores the random number "$r_i$" in the storage module 452 and provides the service corresponding to the right of the digital ticket to the ticket user 410 in operation S960. Thereafter, the ticket inspector 450 requests the ticket issuer 430 to issue a digital ticket having the ticket usable count decreased by one. Meanwhile, if the random number "$r_i$" is present in the storage module 452, the ticket inspector 450 may reject the consumption of the digital ticket since the digital ticket is used duplicately.

Figure 10:
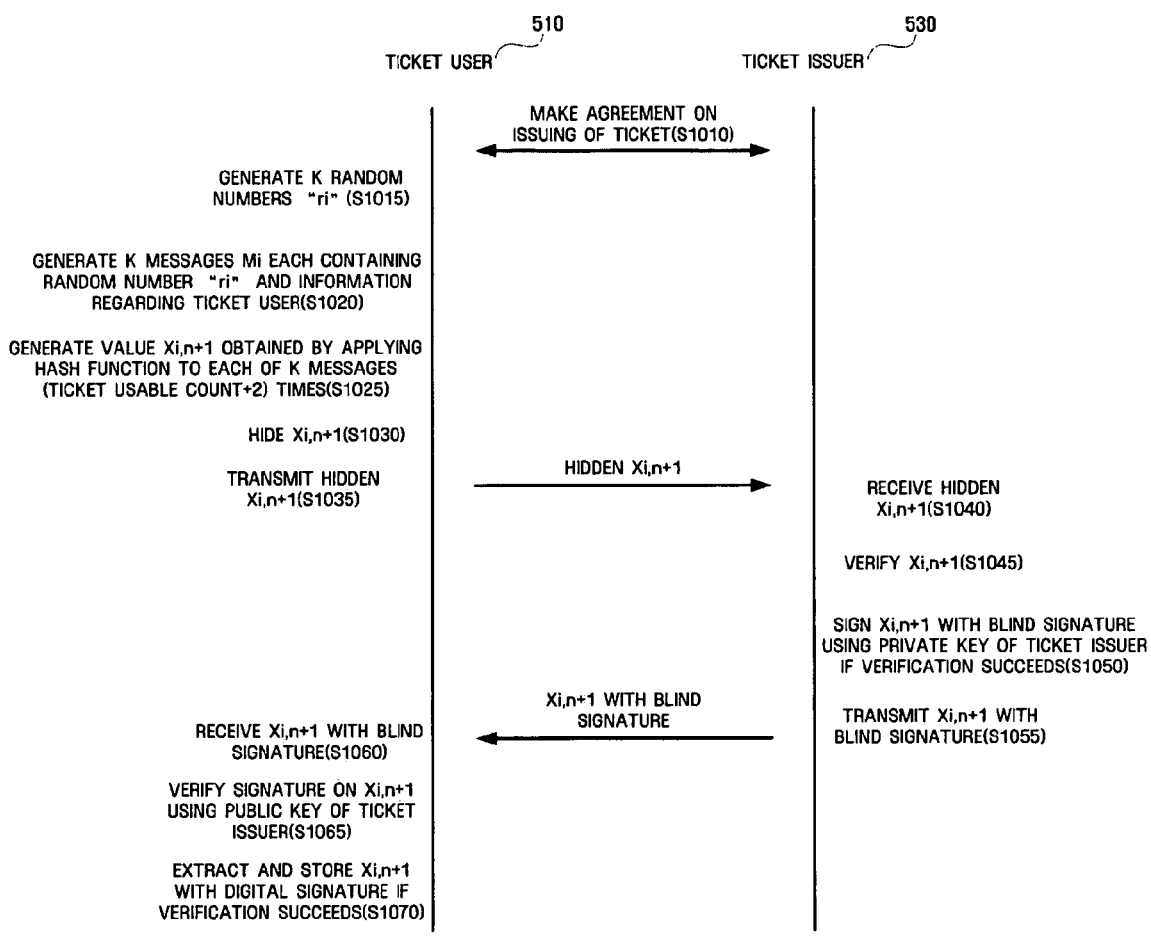
FIG. 10 is a flowchart of a procedure of issuing a digital ticket, which can be used more than once, in the electronic commerce system shown in FIG. 5.

FIG. 10 is a flowchart of a procedure of issuing a digital ticket, which can be used more than once, in the electronic commerce system shown in FIG. 5. In the exemplary, non-limiting embodiment illustrated in FIG. 10, instead of embedding a ticket usable count into a message, a value obtained by applying a hash function to the message proportionally to the ticket usable count is transmitted and received. Unlike the exemplary, non-limiting embodiment illustrated in FIG. 8, user anonymity is guaranteed and information on the ticket usable count is not exposed. The procedure of issuing the digital ticket according to the exemplary, non-limiting embodiment illustrated in FIG. 10 is as follows.

In operation S1010, the ticket user 510 and the ticket issuer 530 make an agreement on issuing of the digital ticket that can be used more than once. The ticket user 510 generates K random numbers "$r_i$" through the message generation module 511 in operation SI 015 and generates K messages $M_i$ each containing the random number "$r_i$" and information regarding the ticket user 510 in operation S1020. The ticket user 510 generates a value obtained by applying a hash function to each of the K messages $M_i$ as many times as a value of (ticket usable count+2) through the hashing module 512 in operation S1025. The ticket user 510 hides the K messages $M_i$ using the message processing module 513 in operation S1030 and transmits the K hidden messages $M_i$ to the ticket issuer 530 through the transceiver module 514 in operation S1035.

The ticket issuer 530 receives the K messages $M_i$ through the transceiver module 531 in operation S1040 and verifies information contained in the K messages $M_i$ through the message verification module 532 in operation S1045. If the K messages $M_i$ are verified, the ticket issuer 530 signs one of the K messages $M_i$ with a blind signature using a private key thereof through the blind signature module 533 in operation S1050, and transmits the message with the blind signature to the ticket user 510 through the transceiver module 531 in operation S1055.

The ticket user 510 receives the message with the blind signature from the ticket issuer 530 in operation S1060 and verifies whether a digital signature on the message has been written by the ticket issuer 530 by decoding the message using a public key of the ticket issuer 530 through the message processing module 513 in operation S1065. If the verification succeeds, the ticket user 510 unblinds the message to extract the message with the digital signature and stores the message with the digital signature in the storage module 515 in operation S1070.

Operation S1025 will be described in detail. A value obtained by applying a widely known one-way hash function H to a message $M_i$ once is represented with $X_{i,0}$. The hashing module 512 consecutively applies the hash function H to the message $M_i$ as many times as a value of (ticket usable count+2) and obtains the following consecutive values: $X_{i,0}$, $X_{i,1}$, $X_{i,2}$, ..., $X_{i,n}$, $X_{i,n+1}$. Here, when "j" is numeral ranging 1 to n+1, $X_{i,j}=H(X_{i,j-1})$ is satisfied. The ticket user 510 hides every $X_{i,n+1}$ with respect to every "i" from 1 to K in operation S1030 and transmits every hidden $X_{i,n+1}$ to the ticket issuer 530 in operation S1035. The hash function H is applied as many times as a value of (ticket usable count+2) in order to protect the content of a digital ticket in a hash state until the digital ticket is consumed as many times as the ticket usable count.

To inspect whether the ticket user 510 cheats on the content of the digital ticket, the ticket issuer 530 performs operation S1045 as follows. The message verification module 532 of the ticket issuer 530 randomly selects one message from among the K messages $M_i$ and requests the ticket user 510 to open the remaining (K-1) messages to the public. The ticket user 510 transmits to the ticket issuer 530 a random number "$r_i$" and an unblind key that unblinds the hidden $X_{i,n+1}$ with respect to each of the requested (K-1) messages. The message verification module 532 of the ticket issuer 530 verifies whether the $X_{i,n+1}$ published using the unblind key coincides with a hash value generated by performing the same operation as performed by the ticket user 510 using the received $r_i$ and the hash function H to determine the (K-1) messages are proper. If the (K-1) messages are determined as being proper, the message verification module 532 transmits the selected one message to the blind signature module 533. When K is appropriately selected, a probability of selecting the one message from among the K messages is $\frac{1}{2}^K$. As a result, it is difficult for the ticket user 510 to predict a message to be selected by the ticket issuer 530. Therefore, it is almost impossible to cheat on the ticket usable count or the like. K indicating the number of random numbers may be adaptively determined according to environmental factors such as a security state of a network and a required security level.

As described above, only messages other than a message randomly selected by the ticket issuer 530 are opened to the public, and the selected message is signed with a digital signature in a blind state by the blind signature module 533 of the ticket issuer 530 and is then transmitted to the ticket user 510. Accordingly, ticket user information is not exposed during the issuing of a digital ticket.

Figure 11:
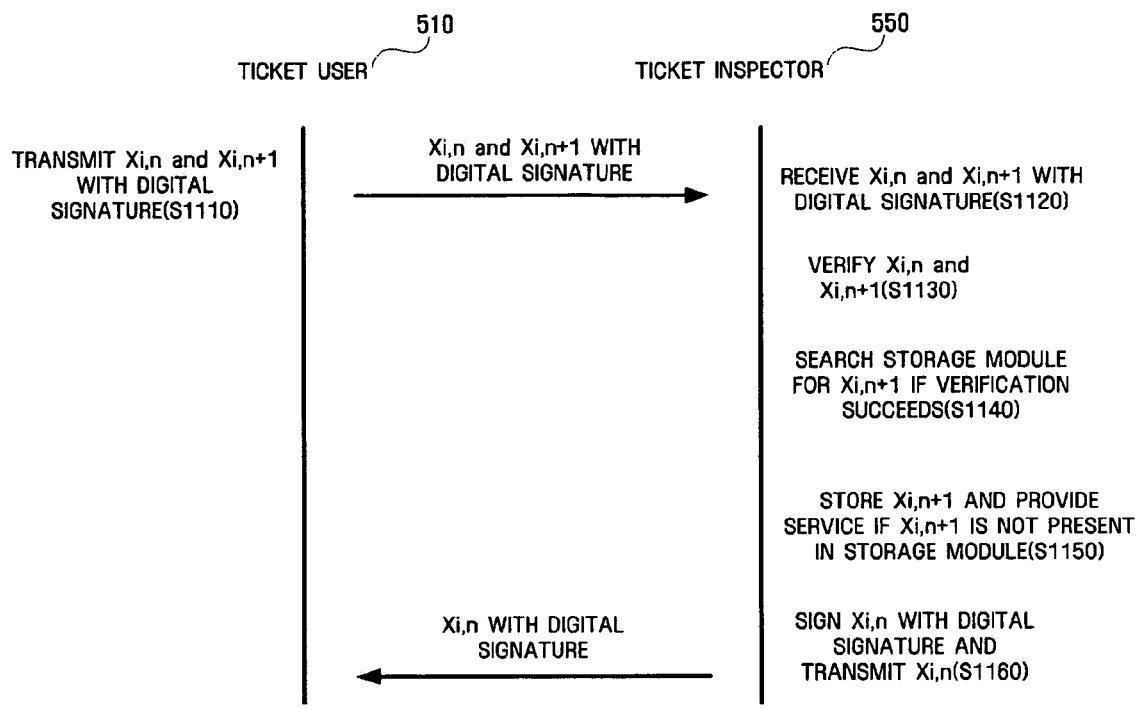
FIG. 11 is a flowchart of a procedure of consuming a digital ticket, which can be used more than once, in the electronic commerce system shown in FIG. 5.

FIG. 11 is a flowchart of a procedure of consuming a digital ticket, which can be used more than once, in the electronic commerce system shown in FIG. 5. The digital ticket issued through the procedure shown in FIG. 10 is consumed as follows.

The ticket user 510 transmits a message $X_{i,n}$ and a message $X_{i,n+1}$ with a digital signature to the ticket inspector 550 in operation S1110. The ticket inspector 550 receives the messages in operation S1120 and verifies whether the digital signature on the message $X_{i,n+1}$ has been written by the ticket issuer 530 by decoding the message using the private key of the ticket issuer 530 through the digital signature verification module 554 in operation S1130. Meanwhile, the hashing module 555 of the ticket inspector 550 verifies whether a relationship of $X_{i,n+1}=H(X_{i,n})$ is accomplished in operation S1130. If both of the two verifications succeed, the ticket inspector 550 performs duplicate use inspection through the duplicate use inspection module 553 in operations S1140 and S1150. If it is determined that the message $X_{i,n+1}$ is a new digital ticket, the ticket inspector 550 provides a service corresponding to a right of the digital ticket to the ticket user 510 and consumes the digital ticket in operation S1160.

The duplicate use inspection is performed by inspecting whether $X_{i,n+1}$ transmitted from the ticket user 510 is a new value that has not been used before. More specifically, the ticket inspector 550 searches the storage module 552 for $X_{i,n+1}$ in operation S1140. If $X_{i,n+1}$ is not present in the storage module 552, the ticket inspector 450 stores $X_{i,n+1}$ in the storage module 552 and provides the service corresponding to the right of the digital ticket to the ticket user 510 in operation SI150. Thereafter, the ticket inspector 550 signs the message $X_{i,n}$, which can be used as a digital ticket having the ticket usable count decreased by one, with a digital signature and then transmits the message $X_{i,n}$ to the ticket user in operation S1160. Meanwhile, if $X_{i,n+1}$, is present in the storage module 552, the ticket inspector 550 may reject the consumption of the digital ticket since the digital ticket is used duplicately.

Additionally, the foregoing methods of electronic commerce using a digital ticket can be implemented in a computer-readable medium. More specifically, the computer-readable medium includes a set of instructions (e.g., a computer program). The instructions include the steps discussed with respect to the foregoing methods. As a result, the present invention can be implemented as software, in addition to the foregoing disclosure.

A method and apparatus for electronic commerce using a digital ticket of the present invention provide at least the following advantages. For example, the method and apparatus guarantee anonymity so that information of a digital ticket user is exposed minimally and the use of a service is facilitated.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. A method for electronic commerce using a digital ticket, the method comprising:
    applying a hash function to a message comprising a random number to obtain a hash value;
    hiding, using a processor, said hash value and transmitting the hidden hash value to a ticket issuer;
    receiving a message from the ticket issuer that comprises the hidden hash value signed with a digital signature by the ticket issuer;
    verifying the digital signature on the received message; and
    transmitting to the ticket issuer the message with the verified digital signature and a value obtained by applying the hash function to the message with the verified digital signature as many times as one of (a) a value one less than a number of times that the hash function has been applied to obtain the hash value and (b) a value proportional to a ticket usable count, to consume a digital ticket.

2. The method of claim 1, wherein the message comprising the random number comprises information regarding a ticket user.

3. A method for electronic commerce using a digital ticket, the method comprising:
- receiving hidden messages each comprising a random number generated by a ticket user;
- signing, using a processor, one of said received messages with a digital signature, and the random number included in the one of said received messages signed with the digital signature is extractable by a ticket issuer; and
- transmitting the message with the digital signature to the ticket user.

4. The method of claim 3, further comprising verifying the received hidden messages, wherein the signing comprises signing the verified messages with the digital signature.

5. The method of claim 4, wherein the verifying of the received message comprises:
- requesting and receiving from the ticket user an unblind key that unblinds remaining messages other than the one message among the received messages; and
- unblinding the remaining messages using the unblind key and verifying information contained in the remaining messages.

6. The method of claim 4, wherein the verifying of the received messages comprises:
- requesting and receiving from the ticket user an unblind key that unblinds remaining messages other than said one message among the received messages and a random number in each of the remaining messages; and
- verifying information contained in the remaining messages based on whether a value obtained by unblinding the remaining messages using the unblind key coincides with a value generated using the random number comprised in the remaining messages.

7. A method for electronic commerce using a digital ticket, the method comprising:
- receiving, using a processor, a message that comprises a random number generated by a ticket user and is signed with a digital signature by a ticket issuer, wherein the ticket issuer signs the message comprising the random number with the digital signature, and the random number included in the message signed with the digital signature is extractable by the ticket issuer;
- verifying the message;
- inspecting whether the message is being used duplicately; and
- providing a service to the ticket user if the message is not being used duplicately.

8. The method of claim 7, wherein the verifying of the message comprises verifying the digital signature.

9. The method of claim 7, wherein the inspecting comprises:
- extracting the random number from the message;
- searching a storage module for the random number; and
- if the random number is not present in the storage module, storing the random number in the storage module.

10. The method of claim 7, further comprising requesting the ticket user to generate a message having a ticket usable count decreased by one.

11. An apparatus for electronic commerce using a digital ticket, the apparatus comprising:
- a processor;
- a message generation module, executed on the processor, that generates a random number and generating a message including the random number;
- a hashing module that applies a hash function to the message to obtain a hash valve;
- a message processing module that hides the hash value; and
- a transceiver module that transmits the hidden hash value to a ticket issuer and receives the message, wherein the hidden hash value is signed with a digital signature by the ticket issuer;
- wherein the message processing module verifies the digital signature on the received message, and the transceiver module transmits the message with the verified digital signature and a value obtained by applying the hash function to the message with the verified digital signature a number of times one less than a number of times that the hash function has been applied to obtain the hash value, to the ticket issuer to consume a digital ticket.

12. An apparatus for electronic commerce using a digital ticket, the apparatus comprising:
- a processor;
- a transceiver module, executed on the processor, that receives hidden messages each comprising a random number generated by a ticket user generated by a ticket user; and
- a blind signature module that signs one of said received messages with a digital signature, and the random number included in the one of said received messages signed with the digital signature is extractable by a ticket issuer;
- wherein the transceiver module transmits the message with the digital signature to the ticket user.

13. An apparatus for electronic commerce using a digital ticket, the apparatus comprising:
- a processor;
- a transceiver module, executed on the processor, that receives a message that includes a random number generated by a ticket user and is signed with a digital signature by a ticket issuer, wherein the ticket issuer signs the message including the random number with the digital signature, and the random number included in the message signed with the digital signature is extractable by the ticket issuer;
- a digital signature verification module that verifies the received message; and
- a duplicate use inspection module that inspects whether the message is being used duplicately.

14. A computer readable storage medium storing a program for executing a method for electronic commerce using a digital ticket, the method comprising:
- applying a hash function to a message comprising a random number to obtain a hash value;
- hiding said hash value and transmitting the hidden hash value to a ticket issuer;
- receiving a message from the ticket issuer that comprises the hidden hash value signed with a digital signature by the ticket issuer;
- verifying the digital signature on the received message; and
- transmitting to the ticket issuer the message with the verified digital signature and a value obtained by applying the hash function to the message with the verified digital signature as many times as one of (a) a value one than a number of times that the hash function has been applied to obtain the hash value and (b) a value proportional to a ticket usable count, to consume a digital ticket.

15. A computer readable recording medium storing a program for executing a method for electronic commerce using a digital ticket, the method comprising:
- receiving hidden messages each comprising a random number generated by a ticket user;
- signing one of said received messages with a digital signature, and the random number included in the one of said received messages signed with the digital signature is extractable by a ticket issuer; and transmitting the message with the digital signature to the ticket user.

16. A computer readable recording medium a program for executing a method for electronic commerce using a digital ticket, the method comprising:

receiving a message that comprises a random number generated by a ticket user and is signed with a digital signature by a ticket issuer, wherein the ticket issuer signs the message comprising the random number with the digital signature, and the random number included in the message signed with the digital signature is extractable by the ticket issuer;

verifying the message;

inspecting whether the message is being used duplicately; and providing a service to the ticket user if the message is not being used duplicately.

* * * * *